United States Patent [19]

Godot

[11] 4,049,254
[45] Sept. 20, 1977

[54] SUPPORTING AND POSITIONING PLATE ASSEMBLY FOR SPECTACLE FRAMES

[75] Inventor: Jean Marie Godot, Brunoy, France

[73] Assignee: Essilor International Cie Generale d'Optique, France

[21] Appl. No.: 704,790

[22] Filed: July 13, 1976

[30] Foreign Application Priority Data

July 24, 1975 France .............................. 75.23087

[51] Int. Cl.² ............................................. B25B 5/14
[52] U.S. Cl. ...................................... 269/156; 269/73
[58] Field of Search .................... 269/156, 258, 71–73; 33/28; 51/217 L, 101 LG, 277, 284 E

[56] References Cited

U.S. PATENT DOCUMENTS

| 3,071,368 | 1/1963 | Harding | 269/258 |
| 3,148,873 | 9/1964 | Chandler | 269/71 |
| 3,617,046 | 11/1971 | Sotonyi | 269/156 |

Primary Examiner—Al Lawrence Smith
Assistant Examiner—Robert C. Watson
Attorney, Agent, or Firm—Diller, Brown, Ramik & Wight

[57] ABSTRACT

A positioning and retaining plate assembly for the controlled location of a spectacle frame comprises three superposed plates slidably mounted in relation to each other. The upper plate, or tray, includes fastening means for a spectacle frame, and is slidable in one direction over the middle plate, or bed plate. The bed plate is slidable in a direction at right angles to the first direction over the lower plate, or base. Locking means are provided for locking the plates in position. The assembly may be mounted on a pedestal provided with a reflective upper surface on which reference axes are marked which can be viewed through apertures provided in the plates.

25 Claims, 8 Drawing Figures

SUPPORTING AND POSITIONING PLATE ASSEMBLY FOR SPECTACLE FRAMES

BACKGROUND OF THE INVENTION

The present invention relates generally to spectacle frames and deals more particularly with supporting and positioning plates suitable for the controlled positioning of a spectacle frame on an apparatus of any kind.

The controlled positioning of a spectacle frame may be necessary for example on a copying machine suitable for cutting a pattern or an ophthalmic lens under the control of a sensor sensitive to the contour of the rim of a spectacle frame.

In order to ensure that a pattern of this kind, and therefore the ophthalmic lens the cutting of which it will subsequently permit, is correctly centred in relation to the spectacle frame rim for which it is intended, it is necessary that the position of this spectacle frame on the corresponding copying machine should be adjusted accordingly, and the same is true in cases where a copying machine is able to effect the direct cutting of an ophthalmic lens with the aid of the spectacle frame in question, without utilising a pattern.

It is for this reason that it is customary to position a spectacle frame on a machine of this kind with the aid of a supporting and positioning plate adapted to permit the control of this positioning.

In supporting and positioning plates intended for this purpose which are known at the present time, the fastening means used for holding a spectacle frame are most usually simple support feet of the claw type which bear against the upper face of the spectacle frame placed against the corresponding supporting and positioning plate and in practice are not able to prevent accidental lateral displacement of the spectacle frame parallel to the plate; plates of this kind are displaced parallel to their plane in relation to a support table and then locked on the latter in the position corresponding to the desired adjustment for the spectacle frame in question.

Consequently this adjustment cannot be effected with great accuracy, while in addition the adjustment is relatively delicate to make.

The present invention on the other hand has as its object a supporting and positioning plate for spectacle frames which is adapted to effect the fastening and positioning of a spectacle frame easily, rapidly, accurately, and securely.

SUMMARY

The supporting and positioning plate of the invention is characterized generally in that it comprises a tray mounted for sliding on a bed plate in a first direction, and in that the said bed plate is in turn mounted for sliding on a base in a second direction perpendicular to the first-mentioned direction, means for locking in position being provided between the said tray, bed plate, and base.

This arrangement makes it possible for the tray carrying a spectacle frame to be displaced very easily in relation to reference axes parallel to the reference axes of the rims of the spectacle frame concerned, in two directions at right angles to one another, and thus to effect the positioning of the spectacle frame rapidly and reliably.

Furthermore, the fastening means provided for the supporting and positioning plate of the invention preferably comprise at least one support block, and in practice a plurality of support blocks.

These support blocks prevent any accidental slipping of the spectacle frame concerned parallel to the tray carrying it, and they thereby ensure that the controlled positioning of the spectacle frame will be maintained.

Finally, the supporting and positioning plate of the invention preferably has associated with it a pedestal which is identical with the pedestal which is intended to receive a plate of this kind in any operating apparatus, and between which and the base carrying the bed plate on which a tray is mounted for sliding there are provided complementary engaging means, the upper face of this pedestal, which carries reference axes and which is left visible by the said base, bed plate, and tray with the aid of cutouts provided for the purpose in them, preferably being constituted by a mirror.

This arrangement makes it possible to avoid any parallax error during the positioning of the spectacle frame carried by the supporting and positioning plate of the invention, in relation to the reference axes lying under it.

DESCRIPTION OF THE PREFERRED EMBODIMENT

Figure 1:
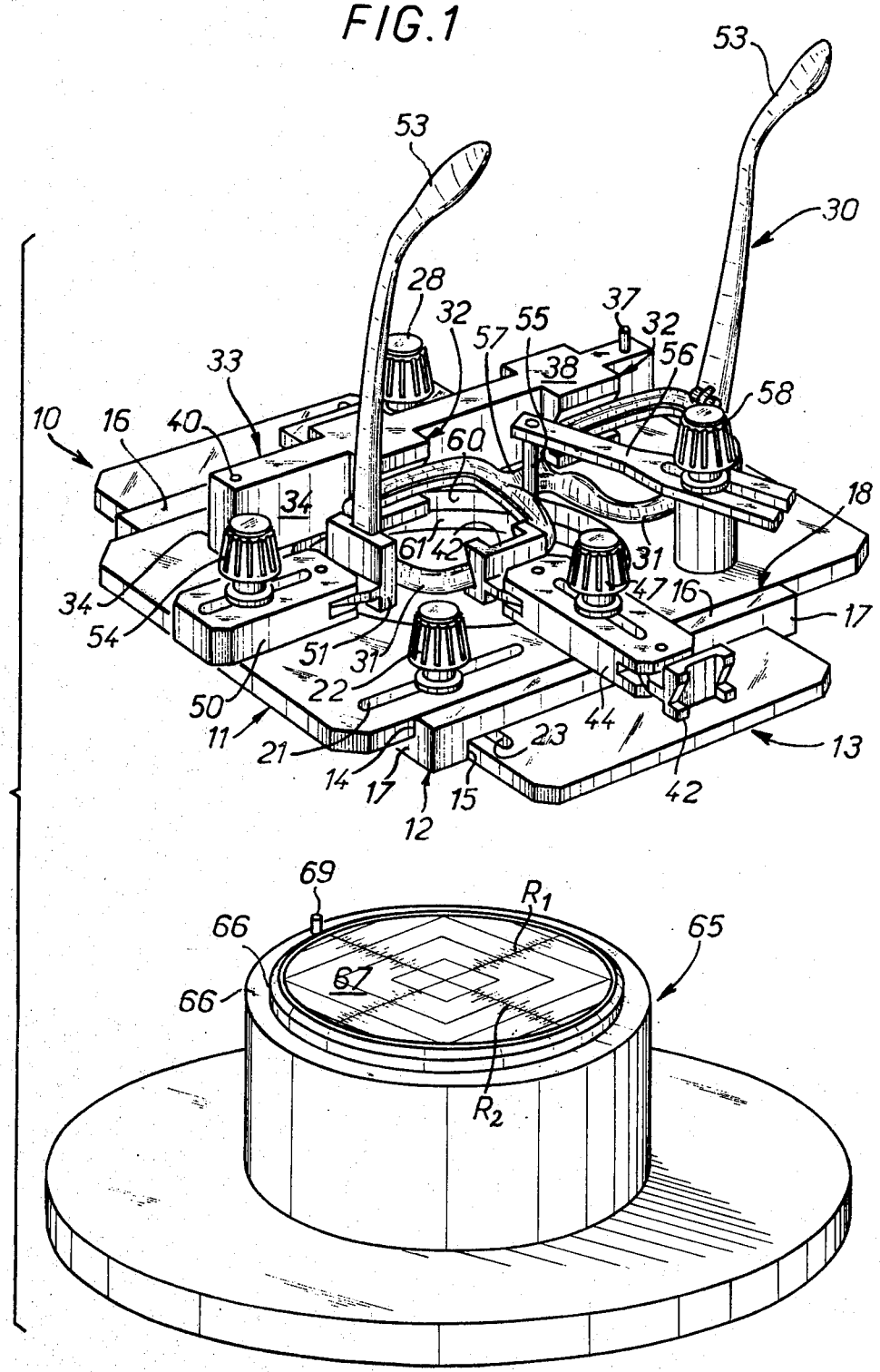
FIG. 1 is a perspective view of a supporting and positioning plate according to the invention and of the pedestal associated with it, a spectacle frame being shown in position on the said plate.

In general, and in the embodiment shown in these drawings, a supporting and positioning plate 10 for a spectacle frame according to the invention comprises a tray 11 mounted for sliding on a bed plate 12 in a first direction, the bed plate 12 being itself mounted for sliding on a base 13 in a second direction perpendicular to the first-mentioned direction.

In the embodiment illustrated, a guide channel 14 having parallel flanks is provided in the upper face of the bed plate 12 to receive slidably the tray 11, and this bed plate 12 has on its bottom face a guide channel 15 having parallel flanks, by which it is slidingly engaged on the underlying base 13, the channels 14 and 15 extending longitudinally in directions at right angles to one another.

In the example illustrated the tray 11 is a simple generally rectangular plate and the depth of the guide channel 14 in which it is engaged is substantially equal to its thickness, so that this tray 11 is flush with the level of the top face of the bed plate 12 in which this guide channel is formed.

Similarly, the base 11 is a simple generally rectangular plate and the depth of the guide channel 15 by which the bed plate 12 is engaged on this base is substantially equal to the thickness of the bed plate, so that the base is substantially flush with the level of the bottom face of the bed plate 12.

Since at the same time the tray 11 and the base 13 have substantially the same thickness and this thickness is substantially equal to half the thickness of the bed plate 12, the latter is in practice reduced to two parallel longitudinal members 16 whose mutually facing flanks constitute the flanks of the guide channel 14, together with two cross-members 17 which transversely connect the longitudinal members 16 at their ends, while being offset in height in relation to the longitudinal members, while their mutually facing flanks constitute the flanks of the guide channel 15.

In other words, the longitudinal members 16 and cross-members 17 together form between them a rectangular cavity 18.

Means of locking in position are provided between the tray 11, bed plate 12, and base 13.

Figure 2:
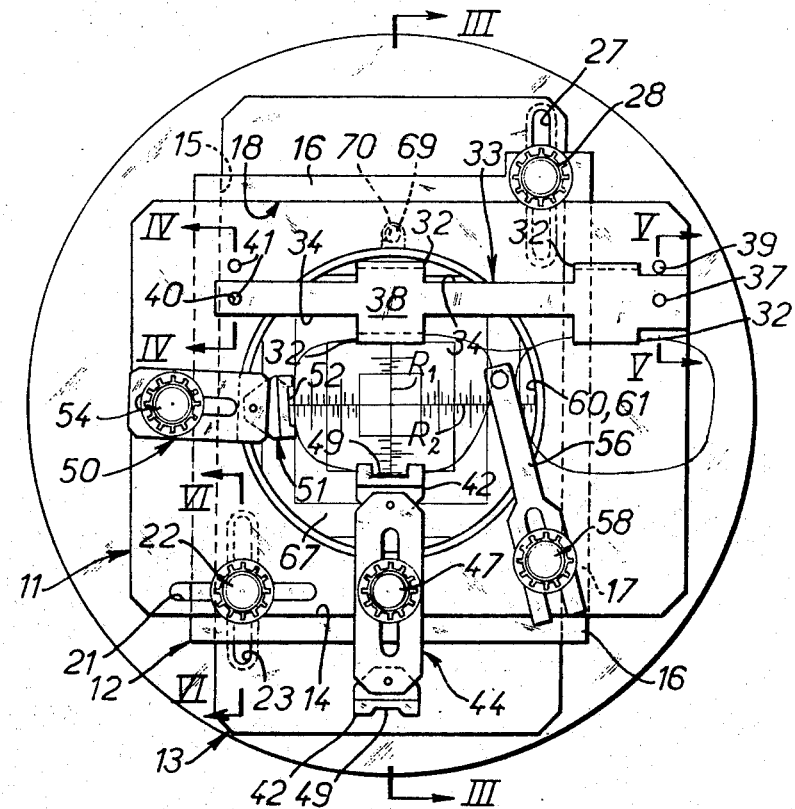
FIG. 2 is a plan view of this supporting and positioning plate in position on the associated pedestal.
Figure 6:
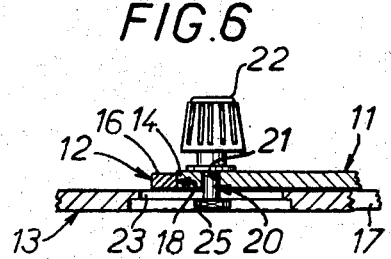

In the example illustrated these locking means comprise a locking pin 20 (FIG. 6) which is secured in position in relation to the bed plate 12 and which passes through a buttonhole 21 formed on the tray 11 parallel to the guide channel 14 in which the tray is slidably mounted, this locking pin 20 being adapted to co-operate axially for locking purposes with a control element 22 (FIGS. 1, 2, and 6).

In the example illustrated the locking pin 20 passes in succession through the tray 11, with the aid of the buttonhole 21 provided in the latter, the bed plate 12 on which this tray is slidably mounted, with the aid of the cavity 18 in the said bed plate, and the base 13 on which the bed plate 12 is in turn slidable, with the aid of a buttonhole 23 provided for the purpose in the said base, its direction being at right angles to that of the buttonhole 21 of the tray 11.

At one end the locking pin 20 has a radial shoulder 25 by which it bears against the base 13 on each side of the buttonhole 23 provided in the latter, the said buttonhole being widened for that purpose, while at its other end the locking pin has a threaded portion on which is screwably engaged a knob or nut forming the associated control element 22 bearing against the tray 11 on each side of the buttonhole 21 provided in the latter.

It is clear that the relative positions of the shoulder 25 of the locking pin 20 and of the control element 22 associated with the latter could be mutually reversed in relation to the elements conjointly constituted by the tray 11 and base 13.

However this may be, it is also clear that when the control element 22 is unlocked the tray 11 is free to slide on the bed plate 12 within the limits of the extent of the buttonhole 21 provided in it, and that conjointly the bed plate 12 is free to slide on the base 13 within the limits of the extent of the buttonhole 23 provided in the said base.

When this sliding takes place the locking pin 20 remains fastened in position in relation to the bed plate 12 through the cavity 18 of which it passes.

When on the other hand the control element 22 is screwed onto the locking pin 20 until it bears against the tray 11, it effects, in conjunction with the radial shoulder 25 of the said locking pin 20, the locking of the tray 11, the bed plate 12, and the base 13 in relation to one another, and any relative displacement of these elements is consequently prevented.

Thus the locking pin 20 can by itself secure in position the tray 11, the bed plate 12, and the base 13.

Nevertheless, in the embodiment illustrated the locking means with which the plate 10 of the invention is equipped also include an additional locking pin, which is not separately visible in the drawings and which is fastened on the bed plate 12 and passes through a buttonhole 27 formed in the base 13 on which the said bed plate 12 is mounted slidably (FIG. 2), this locking pin being adapted to co-operate axially for locking purposes with a control element 28, in an arrangement similar to that described above in connection with the locking pin 20.

In conjunction with the control element 28 associated with it this second locking pin is able to effect the relative locking in position of the bed plate 12 in relation to the base 13.

In the usual manner the plate 10 of the invention is equipped with fastening means adapted to hold in position thereon a spectacle frame 30, and generally, according to the invention, these fastening means include at least one support block.

In the embodiment shown in FIGS. 1 to 6 a support block of this kind has parallel to the tray 11 a longitudinal groove in which one of the rims 31 of a spectacle frame can be engaged laterally by its edge.

In the example illustrated a support block of this kind (reference 32) is carried by a support bar 33 detachably fastened to the tray 11 and projects transversely from one of the lateral longitudinal faces 34 of this bar.

In practice the support bar 33 has two similar support blocks 32 spaced longitudinally apart on its lateral longitudinal face 34 in question, one block for each rim 31 of the spectacle frame 30.

Figure 3:
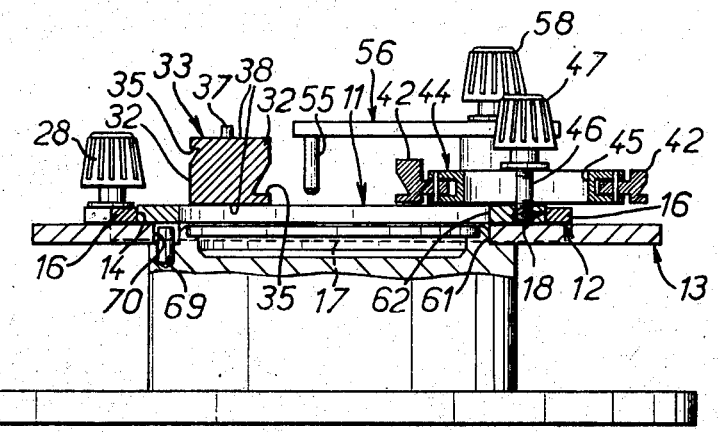
FIG. 3 is a view in axial section of this supporting and positioning plate and pedestal on the line III—III in FIG. 2.

The groove 35 provided in a support block 32 of this kind has a triangular profile in section, as can be seen more clearly particularly in FIG. 3.

One of the flanks of a groove 35 of this kind is substantially perpendicular to the lateral longitudinal face 34 in question of the support bar 33, and therefore extends parallel to the tray 11.

In practice the support bar 33 is mounted reversibly on the tray 11 and on each of its lateral longitudinal faces 34 has support blocks 32, the groove of one such support block on one of its faces being different from the groove of a similar support block on the other of the said faces, and being inverted in relation to that face, for the purpose of adaptation of the support bar 33 to spectacle frames of different thicknesses.

Figure 4:
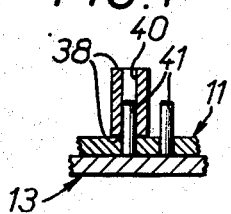
FIGS. 4 to 6 are each respectively views in partial cross-section of the supporting and positioning plate alone, taken respectively on the lines IV—IV, V—V, and VI—VI in FIG. 2.
Figure 5:
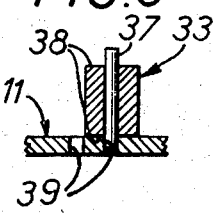

At the same time the support bar 33 is transversely adjustable in position on the tray 11. To this end, complementary engaging means comprising holes and pins are provided on the tray 11 and support bar 33. In the example illustrated these complementary engaging means comprise, at one end of the bar 33, two pins 37 respectively projecting from the top and bottom longitudinal faces 38 of the support bar 33 for the purpose of co-operating with one or the other of two or more holes 39 provided for the purpose in the tray 11 (FIGS. 2 and 5), and at the other end of the said support bar 33 comprise a hole 40 which passes right through this bar from one of its longitudinal faces 38 to the other for the purpose of co-operating with one or the other of two or more pins 41 projecting for that purpose from the tray 11 (FIGS. 2 and 4).

The pins 41 are offset transversely in relation to one another, so as to correspond with the holes 39.

As will easily be understood, it is thus possible to attach the support bar 33 to the tray 11 by either its upper or its lower longitudinal face 38, and by selecting the hole 39 and the pin 41 used to lock the support bar 33 to the plate 11 it is possible to adjust transversely the position of this bar in relation to the tray.

The fastening means provided for the plate 10 of the invention also comprise, opposite the support bar 33 and more precisely opposite one of the support blocks 32 carried by this support bar 33, a support block 42 similar to the support block 32 described above and mounted at the end of a clamp leg 44 which is adjustable in position on the tray 11 and can be locked in position on the latter.

In the example illustrated a support block 42 of this kind is articulated on the clamp leg 44 carrying it, and the leg 44 is mounted pivotally on the tray 11 and carries a support block 42 at each of its ends.

The support blocks 42 of this clamp leg 44 are similar to the blocks 32 of the support bar 33 described above and therefore have longitudinally a groove 35 having a triangular profile in section, as can be best seen particularly in FIG. 3, the groove of a support block 42 situated at one end of the clamp leg 44 being different from the groove in the other support block 42 situated at the other end of the said leg, for the purpose of adapting the latter to the thickness of the spectacle frame which is to be gripped.

In practice, in the example illustrated, the clamp leg 44 has a buttonhole 45 through which passes a locking pin 46 carried by the tray 11 and adapted to co-operate with a locking means 47, this arrangement permitting not only the longitudinal adjustment in position of the clamp leg 44 in relation to the support bar 33, but also, by pivoting the clamp leg 44 180° around the pin 46, the presentation opposite the said support bar 33 of that support block 42 carried by the clamp leg 44 which is best suited for the spectacle frame 30 in question. In the example illustrated, apart from their longitudinal grooves the support blocks 42 of the clamp leg 44 each have a transversal groove 49.

The fastening means provided on the plate 10 of the invention also include a lateral support leg 50 mounted so as to be adjustable in position on the tray 11, laterally in relation to the support bar 33, and to be lockable in position on the said tray through the action of a locking control element 54.

This lateral support leg is fastened to the tray 11 by a buttonhole fastening of the type used for the clamp leg 44, and at its end carries a block 51 provided with a transverse groove 52 in which one of the branches 53 of the spectacle frame 30 can be laterally engaged.

This block 51 is articulated on the end of the lateral support leg 50 carrying it.

The fastening means provided on the plate 10 of the invention finally include a median retaining pin 55 carried transversely at the end of an arm 56 which is mounted so as to be adjustable in position on the tray 11 and lockable in position on the latter, for the purpose of bearing against the centre bridge 57 of the spectacle frame 30.

The arm 56 is fastened to the plate 11 by a buttonhole mounting of the same type as that described with reference to the clamp leg 44, this mounting being under the control of a locking control element 58.

The support bar 33, the clamp leg 44, the lateral support leg 50, and the median retaining arm 56 are disposed round a circular cavity formed in the middle portion of the tray 11, and in a position corresponding to this cavity 60 the base 13 also has a circular cavity 61.

A positioning pedestal 65 (FIGS. 1 and 3) is associated with the plate 10 of the invention, and complementary engaging means are provided for engagement between this pedestal 65 and the base 13 of the plate 10.

In the example illustrated these complementary engaging means comprise on the one hand the cavity 61 of the base 13, and on the other hand a cylindrical bearing surface 66 set back in relation to the top face 67 of the pedestal 65, on the periphery of a radial support shoulder 68 which is also provided on the pedestal.

The pedestal 65 has projecting from its shoulder 68 a pin 69 adapted to co-operate with a socket 70 provided for the purpose in the base 13 and constituting a radial extension of the cavity 61 of the latter (FIGS. 2 and 3).

The upper face 67 of the pedestal 65, which carries orthogonal reference axes R1, R2, is preferably a mirror.

As shown, reference graduations may be associated with each of the reference axes R1, R2.

The cylindrical bearing surface 66 of the pedestal 65 is identical with a cylindrical bearing surface provided for the purpose on the operating apparatus on which the positioning of the spectacle frame 30 has to be effected in a controlled manner.

For this purpose the spectacle frame 30 is first fastened to the tray 11 of the plate 10 with the aid of the various fastening means provided on the latter.

The rims 31 of the spectacle frame are laid flat on the tray 11 and are respectively engaged laterally by their edges in the grooves of the support blocks 32 of the support bar 33, after suitably selecting those support blocks whose grooves are best suited for the spectacle frame concerned, and also after fastening the said support bar to the tray 11 in the transverse position of the bar which is best suited for the spectacle frame 30 concerned.

The arrangement of the spectacle frame 30 on the tray 11 is then such that one of its rims 31 extends substantially above the central zone of the cavity 60 of the said tray.

The clamp leg 44 is then brought into contact with the rim 31 by that block 42 which is best suited for the spectacle frame concerned, the groove of the said block being engaged laterally on the edge of the said rim.

By means of its control element 60 the clamp leg 44 is locked in position.

The lateral support leg 50 is then brought into contact with the rim 31 in question by means of its block 51, this being achieved in the example illustrated by lateral engagement of the groove 52 of this block on the side piece 53 hinged on the same rim; it is obvious that this engagement is not imperative, particularly in the case of a spectacle frame having a special shape.

With the aid of its control element 54 the lateral support leg 50 is then locked in position.

Finally, the median retaining pin 55 is brought into contact with the bridge 57 of the spectacle frame 30, and the arm 56 carrying it is then locked in position by means of its control element 58.

The plate 10 is then placed in position on the pedestal 65 by engaging the cavity 61 in its base 13 on the bearing surface 66 of the said pedestal, this engagement being made in such a manner that the pin 69 projecting from the pedestal 65 penetrates into the corresponding socket 70 in the base 13.

The plate 10 is thus locked angularly in position on the pedestal 65.

Since the upper face 67 of the pedestal 65 remains freely visible because of the cavities formed in the tray 11, bed plate 12, and base 13, it is possible to move these 5 elements in relation to one another in such a manner that the assumed geometrical centre of the spectacle rim 31 in question is superimposed on the centre of the reference axes R1, R2 shown on the upper face 67, or that between these centres there is a determined eccentric offset between the centres in any desired direction, as can be judged with the aid of the graduations associated with the said reference axes R1, R2.

During this adjustment, which is effected by sliding the tray 11 on the bed 12 and sliding the bed 12 on the base 13, the operator attempts to superimpose on the frame rim 31 in question the image of this rim on the mirror formed by the upper face 67 of the pedestal 65, thus eliminating any error of parallax.

When this adjustment has been made, the operator locks the tray 11, bed plate 12, and base 13 in position in relation to one another with the aid of the control elements 22 and 28.

The position of the spectacle frame 30 is thus strictly controlled and adjusted in relation to the axis of the pedestal 65, that is to say in relation to the axis of the cylindrical bearing surface 66 of this pedestal, and the plate 10 can be placed in position on the corresponding cylindrical bearing surface provided for this purpose on the operating apparatus, the spectacle frame 30 then occupying a strictly determined and adjusted position on the said apparatus.

It will have been noted that when a spectacle frame is in position on the supporting and positioning plate of the invention the medium plane of one of the rims of this spectacle frame is parallel to a reference plane which is formed by the upper surface of the tray contained in the said plate, and that the axis which joins the geometrical centres of these rims is parallel to a determined direction, which is imposed by the support bar carried by the tray.

This arrangement facilitates the centring of the spectacle frame rim more particularly concerned, and makes it more accurate and more reliable.

Figure 7:
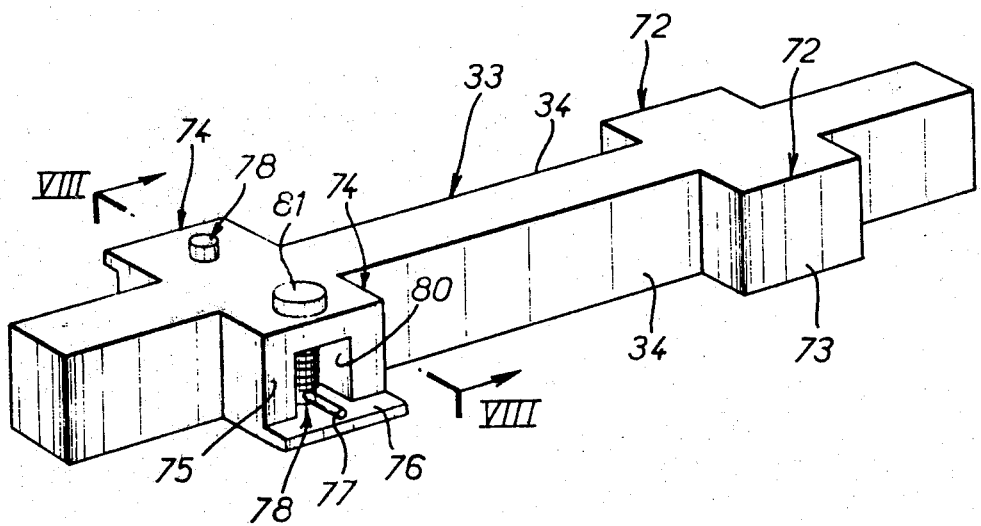
FIG. 7 is a perspective view of a modified embodiment of the support bar forming part of the supporting and positioning plate of the invention.
Figure 8:
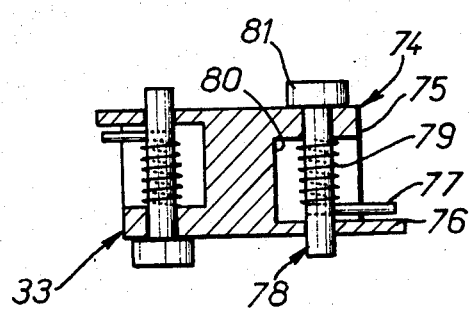
FIG. 8 is a view in cross-section of this modified embodiment, taken on the line VIII—VIII in FIG. 7.

In the modified embodiment shown in FIGS. 7 and 8, which is more particularly suitable for highly curved spectacle frames, the two support blocks projecting from the support bar 33 on each of the two opposite longitudinal faces are not identical.

One of these support blocks (reference 72) is composed of a simple plane support face 73 parallel to the corresponding longitudinal face 34 of the bar 33, but projecting forward from the latter, when the support bar 33 is in position, so that its support face 73 is perpendicular to the tray 11 and parallel to the reference axis R2.

The other support block (reference 74) has two support faces forming a right angle, one (reference 75) being coplanar with the face 73 of the associated support block 72, while the other (reference 76) is perpendicular to the face 75 and forms a kind of ledge.

With this face 76 is associated a support pin 77 joined to a pin 78 mounted for axial movement in the support bar 33 perpendicularly to the said face 76 and against the action of a spring 79, which is engaged on the pin 78 and accommodated in a cavity 80 in the support bar 33, bearing on the one hand against the opposite face of this cavity 80 to that forming the support face 76 and on the other hand against the support pin 77 associated with the face 76 and therefore urging the pin 77 in the direction of the latter.

Outside the support bar 33 the pin 78 has a head 82 enabling it to be gripped.

As will easily be understood, by means of this head it is possible to raise the pin 78 and consequently the pin 77 a sufficient distance to insert under it the rim of the spectacle frame concerned until it bears against the face 75.

After the pin 78 is released the pin 77 holds the spectacle frame rim bearing elastically against the face 76.

At the same time the other rim of the spectacle frame in question simply bears against the face 73 formed on the other support block 72.

Between the two support blocks 72 of the same longitudinal face 34 of the support bar 33 it is possible to insert the middle bridge of the spectacle frame in question when the latter projects in relation to the rims connected by it.

The two blocks 74 projecting from each of the two respective longitudinal faces 34 of the support bar 33 are identical as a whole, but the width of their faces 76 forming ledges are different, one of these faces being suitable for thin spectacle frame rims and the other for thick spectacle frame rims.

In conjunction with a modified support bar 33 of this kind the other component elements of the supporting and positioning plate of the invention may be identical to the corresponding elements described above, or may utilise the arrangement of a supporting face and movable supporting pin employed in this modified construction.

The invention is obviously not limited to the embodiments described and illustrated, but includes any modified embodiments.

In particular, as illustrated, the upper face 67 of the pedestal 65 may carry, in addition to the reference axes and graduations, circles, squares, or other geometrical figures suitable for assisting the appreciation which the operator must make of the position of the assumed geometrical centre of the spectacle frame rim concerned.

I claim:

1. A supporting and positioning plate adapted for the controlled positioning of a spectacle frame, comprising fastening means adapted to hold a spectacle frame, a bed plate, a tray mounted for sliding in a first direction on the bed plate, a base on which said bed plate is in turn mounted for sliding in a second direction perpendicular to the first-mentioned direction locking means for locking the elements in position provided between said tray, said bed plate, and said base, a positioning pedestal, complementary engagement means being provided between the said pedestal and the base of the plate, and the base, bed plate, and tray being provided with mutually corresponding cavities which leave the upper face of the pedestal visible, and around which are disposed the associated spectacle frame fastening means, the upper face of the pedestal being provided with reference axes.

2. A plate according to claim 1, characterized in that said tray is mounted for sliding in a guide channel provided in the upper face of the subjacent bed plate.

3. A plate according to claim 2, characterized in that the bed plate is provided on its lower face with a guide channel by which the tray is slidingly engaged on the subjacent base.

4. A plate according to claim 3, characterized in that the guide channels provided in the bed plate extend in directions at right angles to one another.

5. A plate according to claim 1, characterized in that said locking means comprise a locking pin which is fastened in relation to the bed plate and which passes through a buttonhole formed in the tray, and said pin is adapted to co-operate axially for locking purposes with a control element.

6. A plate according to claim 5, characterized in that said locking means comprise a locking pin which is fastened on the bed plate and which passes through a buttonhole formed in the base associated with the said bed plate, and said locking pin is adapted to co-operate axially for locking purposes with a control element.

7. A plate according to claim 6, characterized in that the or each said locking pin passes in succession through the tray with the aid of a buttonhole, the bed plate with the aid of a cavity provided in said bed plate, and the base with the aid of a buttonhole disposed in a direction perpendicular to the first-mentioned buttonhole, the or each said pin having at one end a shoulder by which it bears on one of the elements comprising the tray and the base, and at the other end a threaded portion on which is engaged a knob or nut forming a control element and bearing on the other of the said elements comprising the tray and base.

8. A plate according to claim 1, characterized in that said fastening means includes at least one support block.

9. A plate according to claim 8, characterized in that a support block is provided longitudinally with a groove in which one of the rims of a spectacle frame can be engaged laterally by its edge.

10. A plate according to claim 8, characterized in that the support block has two support faces at right angles to one another, and a support pin is associated with one support face and urged elastically in the direction of said support face.

11. A plate according to claim 8, characterized in that the support block is formed from a plane support face.

12. A plate according to claim 8, characterized in that the support block is carried by a bar joined to the tray and projects transversely from one of the lateral longitudinal faces of the bar.

13. A plate according to claim 12, characterized in that the said bar has two support blocks spaced longitudinally apart on one of its lateral longitudinal faces, one such block being provided for each spectacle frame rim.

14. A plate according to claim 13, characterized in that said bar is mounted reversibly on the tray and has at least one support block on each of its lateral longitudinal faces, each support block having at least one characteristic difference from the corresponding characteristic of the support block on the other of the said faces.

15. A plate according to claim 14, characterized in that means are provided for transversely adjusting the position of the bar on the tray.

16. A plate according to claim 15, characterized in that complementary engagement means comprising holes and pins are provided between the tray and the bar, at each of the ends of the latter.

17. A plate according to claim 12, characterized in that said fastening means comprise, facing the said bar, a support block mounted at the end of a clamp leg which is adjustable in position on the tray and lockable in position on the latter.

18. A plate according to claim 17, characterized in that the support block is articulated on the clamp leg.

19. A plate according to claim 17, characterized in that the clamp leg is pivotally mounted on the tray and carries a support block at each of its ends, the support block at one of the ends having at least one characteristic difference from the support block at the other of the said ends.

20. A plate according to claim 9, characterized in that the groove provided in the support block has a triangular profile in section.

21. A plate according to claim 12, characterized in that the fastening means comprise, laterally in relation to the said bar, a lateral support leg mounted for adjustment with respect to the tray and lockable in position thereon.

22. A plate according to claim 21, characterized in that said lateral support leg carries a block provided transversely with a groove in which one of the side pieces of a spectacle frame can be laterally engaged.

23. A plate according to claim 22, characterized in that said block is articulated at the end of the lateral support leg on which it is mounted.

24. A plate according to claim 8, characterized in that the fastening means comprise a median retaining pin carried transversely by an arm mounted adjustably in position on the tray and capable of being locked in position on the latter to bear against the centre bridge of a spectacle frame.

25. A plate according to claim 1, characterized in that the upper face of the pedestal is a mirror on which the reference axes are marked.

* * * * *